US011302962B2

(12) United States Patent
Umeyama et al.

(10) Patent No.: US 11,302,962 B2
(45) Date of Patent: Apr. 12, 2022

(54) NON-AQUEOUS ELECTROLYTE SECONDARY BATTERY

(71) Applicant: TOYOTA JIDOSHA KABUSHIKI KAISHA, Toyota (JP)

(72) Inventors: Hiroya Umeyama, Okazaki (JP); Akihiro Taniguchi, Ashiya (JP); Hideki Sano, Ikeda (JP); Hideaki Fujita, Kyoutanabe (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 259 days.

(21) Appl. No.: 14/692,820

(22) Filed: Apr. 22, 2015

(65) Prior Publication Data

US 2015/0333323 A1 Nov. 19, 2015

(30) Foreign Application Priority Data

May 19, 2014 (JP) ............................ JP2014-103327

(51) Int. Cl.
*H01M 10/02* (2006.01)
*H01M 10/0567* (2010.01)
(Continued)

(52) U.S. Cl.
CPC ....... *H01M 10/0567* (2013.01); *H01M 4/364* (2013.01); *H01M 4/525* (2013.01);
(Continued)

(58) Field of Classification Search
CPC ........... H01M 10/0567; H01M 2/1252; H01M 2/345; H01M 4/364; H01M 4/525;
(Continued)

(56) References Cited

U.S. PATENT DOCUMENTS

| | | | | |
|---|---|---|---|---|
| 6,148,503 A * | 11/2000 | Delnick | .............. | H01M 2/1673 29/623.1 |
| 6,632,572 B1 * | 10/2003 | Takahashi | .............. | H01M 2/34 252/62.2 |

(Continued)

FOREIGN PATENT DOCUMENTS

| | | |
|---|---|---|
| DE | 60018852 T2 | 3/2006 |
| JP | 2006-324235 A | 11/2006 |

(Continued)

OTHER PUBLICATIONS

Machine translation of JP 2003-242966, retrieved from www.espacenet.com on Jan. 4, 2020.*

*Primary Examiner* — Cynthia K Walls
(74) *Attorney, Agent, or Firm* — Sughrue Mion, PLLC

(57) ABSTRACT

A non-aqueous electrolyte secondary battery includes: a pressure-type current interrupt device arranged in a conductive path, for interrupting the conductive path when an internal pressure exceeds a working pressure; a non-aqueous electrolyte; and a positive electrode composite material layer. The non-aqueous electrolyte contains a gas generation agent that generates a gas in an overcharge region, and the positive electrode composite material layer contains a first positive electrode active material particle including lithium iron phosphate, and a second positive electrode active material particle including lithium-nickel composite oxide. A ratio of the first positive electrode active material particle to a total mass of the first positive electrode active material particle and the second positive electrode active material particle is 5% by mass or more and 20% by mass or less.

20 Claims, 8 Drawing Sheets

100 70 72 30 32 35 38 80 55 54 33 76 74 36 34 50 EP EP 52 10a 20a

(51) Int. Cl.

| | |
|---|---|
| ***H01M 4/36*** | (2006.01) |
| ***H01M 10/42*** | (2006.01) |
| ***H01M 4/58*** | (2010.01) |
| ***H01M 4/525*** | (2010.01) |
| ***H01M 50/35*** | (2021.01) |
| ***H01M 50/578*** | (2021.01) |
| *H01M 4/02* | (2006.01) |

(52) U.S. Cl.
CPC ..... *H01M 4/5825* (2013.01); *H01M 10/4235* (2013.01); *H01M 50/35* (2021.01); *H01M 50/578* (2021.01); *H01M 2004/021* (2013.01); *H01M 2004/028* (2013.01); *H01M 2200/20* (2013.01)

(58) Field of Classification Search
CPC ........... H01M 4/5825; H01M 10/4235; H01M 2004/021; H01M 2004/028; H01M 2200/20; Y02E 60/122
See application file for complete search history.

(56) References Cited

U.S. PATENT DOCUMENTS

| | | | | |
|---|---|---|---|---|
| 2004/0072062 A1* | 4/2004 | Kita | H01M 2/0285 | 429/90 |
| 2008/0203363 A1* | 8/2008 | Miyazaki | C01G 49/00 | 252/521.2 |
| 2009/0087731 A1* | 4/2009 | Fukui | H01M 4/131 | 429/164 |
| 2009/0123813 A1* | 5/2009 | Chiang | C01B 25/45 | 429/50 |
| 2010/0227222 A1* | 9/2010 | Chang | C01D 15/00 | 429/231.95 |
| 2011/0171525 A1* | 7/2011 | Abe | H01M 4/623 | 429/212 |
| 2011/0236752 A1* | 9/2011 | Kawakami | H01M 4/366 | 429/188 |
| 2012/0107652 A1 | 5/2012 | Iyori et al. | | |
| 2013/0011740 A1* | 1/2013 | Konishi | H01M 4/525 | 429/223 |
| 2015/0010784 A1* | 1/2015 | Takahata | H01M 10/0525 | 429/7 |
| 2015/0372304 A1* | 12/2015 | Hasegawa | H01M 4/62 | 429/231.95 |

FOREIGN PATENT DOCUMENTS

| | | | | |
|---|---|---|---|---|
| JP | 2011228293 A | 11/2011 | | |
| JP | 2012079523 A | 4/2012 | | |
| JP | 2012109219 A | 6/2012 | | |
| JP | 2013125712 A | 6/2013 | | |
| JP | 2013145737 A | 7/2013 | | |
| JP | 2014036010 A | 2/2014 | | |
| WO | WO-2013125305 A1 * | 8/2013 | | H01M 10/0525 |

* cited by examiner

NON-AQUEOUS ELECTROLYTE SECONDARY BATTERY

This nonprovisional application is based on Japanese Patent Application No. 2014-103327 filed on May 19, 2014 with the Japan Patent Office, the entire contents of which are hereby incorporated by reference.

BACKGROUND OF THE INVENTION

Field of the Invention

The present invention relates to a non-aqueous electrolyte secondary battery.

Description of the Background Art

Japanese Patent Laying-Open No. 2006-324235 discloses a non-aqueous electrolyte secondary battery including a sealing plate having a current interruption pressure of 12 $kgf/cm^2$ or less, and a non-aqueous electrolyte containing cyclohexylbenzene (CHB) as an additive.

SUMMARY OF THE INVENTION

Charging a secondary battery in excess of a prescribed rated capacity or an upper limit charging voltage is generally referred to as "overcharge". If a non-aqueous electrolyte secondary battery is overcharged, the non-aqueous electrolyte secondary battery deteriorates. Therefore, a protective circuit and a control device are normally provided to prevent the overcharge. However, unexpected malfunction or misuse may cause overcharge in some cases. Thus, a non-aqueous electrolyte secondary battery has been developed including a current interrupt device (CID) that can stop a battery function even if the non-aqueous electrolyte secondary battery is overcharged.

Japanese Patent Laying-Open No. 2006-324235 discloses a so-called pressure-type CID. The pressure-type CID is a CID that physically interrupts a conductive path when an internal pressure of a battery exceeds a prescribed pressure (also referred to as "working pressure"), and the pressure-type CID is often used together with a gas generation agent (such as CHB). The gas generation agent such as CHB is also referred to as an overcharge additive. This gas generation agent has an oxidation potential in an overcharge region, and when a positive electrode potential exceeds the oxidation potential, the gas generation agent generates a gas and promotes an increase in internal pressure, i.e., actuation of the CID. However, even in the case of using such a gas generation agent, there is still room for improvement in the actuation timing of the pressure-type CID.

The actuation timing of the CID can be evaluated by using, for example, a state of charge (SOC) of the battery as a measure. Specifically, in a region where the SOC of the battery exceeds 100% (overcharge region), the actuation timing becomes earlier as the SOC at the time of actuation of the CID becomes lower. As described above, the pressure-type CID is actuated depending on the internal pressure of the battery. Therefore, in order to actuate the CID at an earlier stage, a prescribed amount of generated gas must be ensured at an early stage at the time of overcharge.

However, in a battery having a large space volume therein, like a vehicle-mounted large battery, it is not easy to ensure the amount of generated gas. In such a large battery, an attempt is currently being made to increase an amount of the gas generation agent to actuate the CID at an earlier stage. However, even when an amount of the added gas generation agent exceeds 7% by mass, the SOC at the time of actuation of the CID remains at approximately 160%.

In addition, the actuation timing of the pressure-type CID may also be delayed due to an influence of the temperature. Specifically, under a high temperature environment, a shuttle reaction competing with a decomposition reaction of the gas generation agent becomes dominant and the amount of generated gas itself decreases, and thus, the actuation of the CID is delayed. Therefore, in order to reliably actuate the pressure-type CID even under the high temperature environment, the amount of the gas generation agent is forced to be further increased.

However, there is concern that further increase in amount of the gas generation agent results in an increase in production cost and affects the battery performance. It is also conceivable to lower the working pressure itself of the pressure-type CID. In this case, however, there is concern that malfunction (breakage) of the CID occurs due to vibration and impact. Therefore, this is not considered as a reasonable solution.

Thus, in view of the aforementioned problems, an object of the present invention is to provide a non-aqueous electrolyte secondary battery in which a pressure-type CID is actuated reliably and at an early stage.

A non-aqueous electrolyte secondary battery includes: a pressure-type current interrupt device arranged in a conductive path, for interrupting the conductive path when an internal pressure exceeds a working pressure; a non-aqueous electrolyte; and a positive electrode composite material layer, wherein the non-aqueous electrolyte contains a gas generation agent that generates a gas in an overcharge region, the positive electrode composite material layer contains a first positive electrode active material particle including lithium iron phosphate, and a second positive electrode active material particle including lithium-nickel composite oxide, and a ratio of the first positive electrode active material particle to a total mass of the first positive electrode active material particle and the second positive electrode active material particle is 5% by mass or more and 20% by mass or less.

The non-aqueous electrolyte secondary battery is different from the conventional art in that the two types of the positive electrode active materials are mixed at a particular ratio, thereby promoting gas generation in the overcharge region.

Lithium iron phosphate has a feature that the potential is high in the overcharge region. Attention was focused on this feature, and it was determined that the use of lithium iron phosphate allows promotion of gas generation at the time of overcharge, and various verifications were conducted to develop such a non-aqueous electrolyte secondary battery. As a result, positive proof was obtained that by using lithium iron phosphate, a battery voltage (positive electrode potential) at the time of overcharge becomes higher and gas generation at the time of overcharge can be promoted.

However, lithium iron phosphate has a disadvantage of being small in capacity per volume. Thus, a study was conducted of a positive electrode in which lithium iron phosphate is mixed with lithium-nickel composite oxide that is large in capacity per volume. Then, surprisingly, it was found that a reduction in capacity can be suppressed and gas generation at the time of overcharge can be significantly promoted at a particular mixing ratio, and thus, the CID can be actuated at an earlier stage.

Namely, the non-aqueous electrolyte secondary battery is characterized in that the ratio of lithium iron phosphate to the total mass of lithium iron phosphate and lithium-nickel composite oxide is restricted to 5% by mass or more and 20% by mass or less. Both when the ratio is less than 5% by mass and when the ratio exceeds 20% by mass, an amount of generated gas required for a large battery cannot be ensured. Furthermore, when the ratio exceeds 20% by mass, a reduction in capacity occurs. However, when the ratio is 5% by mass or more and 20% by mass or less, a sufficient amount of generated gas can be ensured at the time of overcharge. Not only that, but the output property at low SOC is enhanced by lithium iron phosphate, and thus, the reduction in capacity can be compensated for.

"Positive electrode active material particle" in the present specification includes a primary particle formed of a positive electrode active material, a secondary particle formed by agglomeration of the primary particles, and a composite particle having a coating layer and the like formed on a surface of the secondary particle.

Preferably, a porosity of the positive electrode composite material layer is 20% or more and 32% or less.

The first positive electrode active material particle including lithium iron phosphate is small in capacity per volume. Therefore, when the ratio of the first positive electrode active material particle in the positive electrode composite material layer is heightened, the capacity per volume of the positive electrode composite material layer decreases. On the other hand, in order to ensure the capacity per volume of the positive electrode composite material layer with the ratio of the first positive electrode active material particle maintained, it is necessary to heighten a composite material density of the positive electrode composite material layer, and in this case, the porosity of the positive electrode composite material layer decreases. When the porosity of the positive electrode composite material layer decreases, the discharge property deteriorates, and also, a contact rate or reaction field between the positive electrode active material particle and the gas generation agent decreases, which results in a reduction in gas generation efficiency. In addition, the gas generated in the positive electrode composite material layer cannot be released efficiently and a velocity of an increase in internal pressure may be slowed down in some cases. In contrast, when the porosity is too high, the conductivity between the positive electrode active material particles decreases and a reaction between the positive electrode active material particle and the gas generation agent does not proceed quickly, and in this case as well, the gas generation efficiency decreases. Thus, by controlling the porosity of the positive electrode composite material layer to 20% or more and 32% or less, these problems can be minimized.

The porosity of the positive electrode composite material layer is calculated in accordance with the following equation:

$$(\text{porosity})=(V_L-V_p)\div V_L.$$

In the aforementioned equation, $V_L$ represents "volume of the positive electrode composite material layer", and $V_p$ represents "volume of the positive electrode composite material". $V_L$ can be calculated from $V_L=L\times W\times T$ when L represents a length dimension of the positive electrode composite material layer, W represents a width dimension thereof, and T represents a thickness dimension thereof. In addition, $V_p$ can be calculated by dividing "mass of the positive electrode composite material layer" by "true density of the positive electrode composite material". The true density of the positive electrode composite material can be calculated from true densities of respective materials that form the positive electrode composite material and a blending ratio of the respective materials.

Preferably, the gas generation agent includes cyclohexylbenzene.

Cyclohexylbenzene (CHB) is particularly suitable as the gas generation agent. The gas generation agent can further include a compound other than CHB.

Preferably, a content of the gas generation agent in the non-aqueous electrolyte is 1% by mass or more and 7% by mass or less.

When the content of the gas generation agent is 1% by mass or more, the pressure-type CID can be actuated reliably and at an early stage even under the high temperature environment, for example. When the content of the gas generation agent is 7% by mass or less, the battery performance is less affected and this is economically advantageous.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

One embodiment (hereinafter also referred to as "the present embodiment") of the present invention will be described in detail hereinafter, while the present embodiment is not limited thereto. In the following description, "average particle size" refers to a median size (so-called "d50") measured by a laser diffraction/scattering method, unless otherwise noted.

[Non-Aqueous Electrolyte Secondary Battery]

Figure 1:
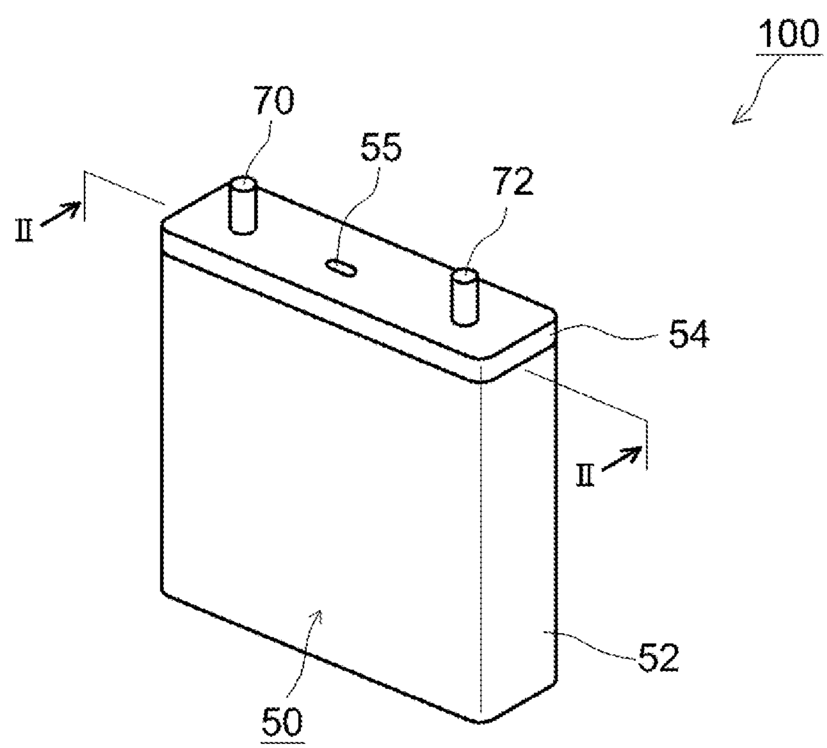
FIG. 1 is a schematic perspective view showing one example of a configuration of a non-aqueous electrolyte secondary battery according to one embodiment of the present invention.

FIG. 1 is a schematic perspective view showing one example of a configuration of a non-aqueous electrolyte secondary battery according to the present embodiment. Referring to FIG. 1, a battery 100 is a sealed-type battery and includes a prismatic package 50. Package 50 is configured by a case 52 and a lid 54. A material of package 50 is, for example, an Al alloy. Case 52 and lid 54 are joined by, for example, laser welding. Lid 54 is provided with a positive electrode terminal 70 and a negative electrode terminal 72. Lid 54 is also provided with a safety valve 55 for emitting a gas generated in package 50. Safety valve 55 is adjusted to be opened at a pressure higher than a working pressure of a pressure-type CID described below.

Figure 2:
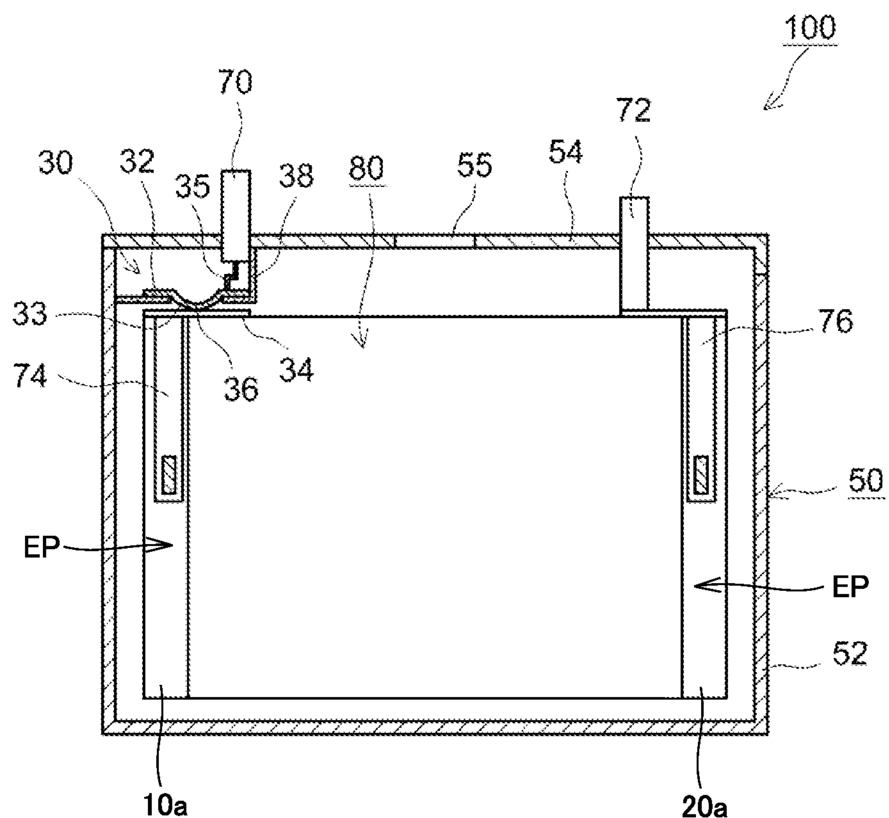
FIG. 2 is a schematic cross-sectional view, taken along line II-II in FIG. 1, showing one example of the configuration of the non-aqueous electrolyte secondary battery according to one embodiment of the present invention.

An internal structure of battery 100 will be described. FIG. 2 is a schematic cross-sectional view of battery 100 taken along line II-II in FIG. 1. Referring to FIG. 2, battery 100 has an electrode assembly 80 and a non-aqueous electrolyte (not shown) incorporated therein. Battery 100 is not completely filled with these incorporated members and there is a space volume in battery 100. "Space volume" herein refers to a volume obtained by deducting a volume of the incorporated members (such as electrode assembly 80 and the non-aqueous electrolyte) from an inner volume of package 50. The present embodiment is effective for a large battery having a large space volume therein. Examples of such a large battery can include, for example, a battery (having a rated capacity of roughly 20 Ah or more) used in a hybrid vehicle (HV), an electric vehicle (EV) or the like.

<Pressure-Type Current Interrupt Device>

A pressure-type CID 30 is arranged in a conductive path on the positive electrode side of battery 100. Pressure-type CID 30 includes a deformable metal plate 32, a connection metal plate 34 and an insulating case 38. Connection metal plate 34 is electrically connected to a positive electrode collector plate 74. Deformed metal plate 32 has a curved portion 33 having a central portion curved downward, and is joined to connection metal plate 34 at a tip (joint point 36) of curved portion 33. Deformed metal plate 32 is also electrically connected to positive electrode terminal 70 by a collector lead 35. The conductive path extending from positive electrode terminal 70 to positive electrode collector plate 74 is thus formed.

Insulating case 38 is made of, for example, resin. Insulating case 38 is arranged to surround deformed metal plate 32, seals a space surrounded by deformed metal plate 32, insulating case 38 and package 50, and separates this space from the other space in package 50.

When an internal pressure of package 50 increases, the internal pressure acts on a lower surface of curved portion 33 of deformed metal plate 32 and pushes curved portion 33 upward. When the internal pressure exceeds the working pressure, curved portion 33 is turned upside down and joint point 36 is cut, such that the conductive path can be interrupted.

In FIG. 2, the pressure-type CID is provided in the conductive path on the positive electrode side. However, the pressure-type CID may be provided in a conductive path on the negative electrode side, or may be provided in both of the conductive paths. In addition, the pressure-type CID is not limited to the aforementioned configuration, and the pressure-type CID may have any configuration as long as the pressure-type CID is actuated in response to an increase in internal pressure. For example, the CID may be an external circuit that interrupts a current when a pressure value of an internal pressure detected by a sensor exceeds a set value.

<Electrode Assembly>

Figure 3:
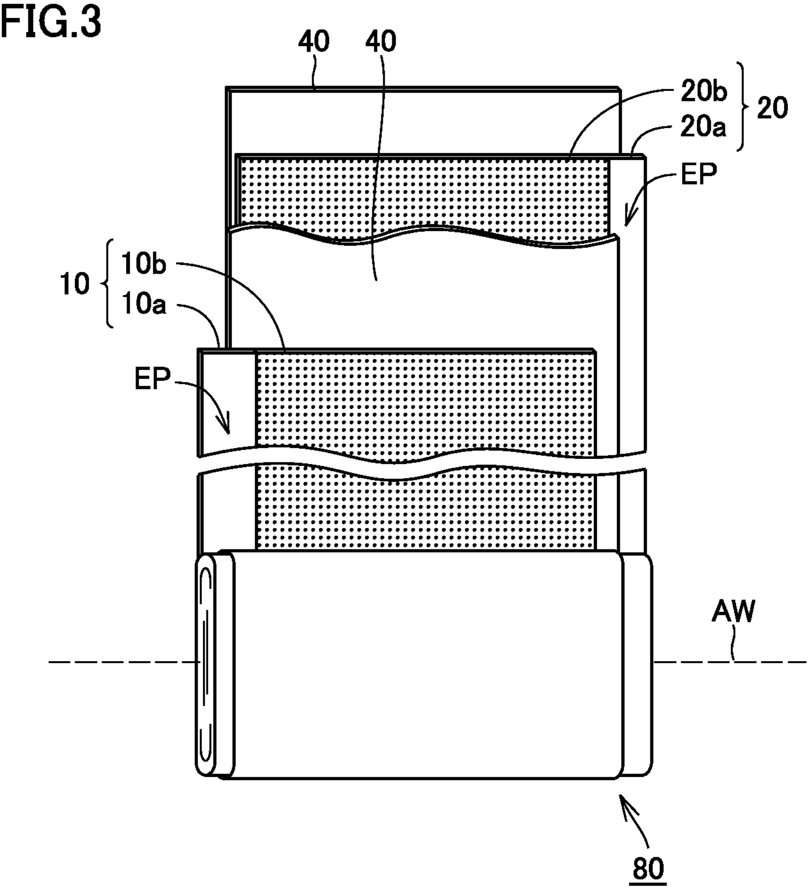
FIG. 3 is a schematic view showing one example of a configuration of an electrode assembly according to one embodiment of the present invention.

FIG. 3 is a schematic view showing a configuration of electrode assembly 80. Referring to FIG. 3, electrode assembly 80 is formed by winding a positive electrode plate 10 and a negative electrode plate 20 such that positive electrode plate 10 and negative electrode plate 20 face each other with a separator 40 interposed therebetween. As described below, each of positive electrode plate 10 and negative electrode plate 20 is a long strip-like sheet member and has, at one side end in the shorter-side direction (width direction), a core exposed portion EP where a collector core material (typically, metal foil) is exposed. In electrode assembly 80, positive electrode plate 10 and negative electrode plate 20 are arranged to face each other such that core exposed portions EP thereof are removed from different directions on a winding axis AW.

Referring again to FIG. 2, positive electrode collector plate 74 and a negative electrode collector plate 76 are welded to core exposed portions EP of electrode assembly 80, respectively. As described above, positive electrode collector plate 74 is connected to positive electrode terminal 70 via pressure-type CID 30, and negative electrode collector plate 76 is connected to negative electrode terminal 72. In battery 100, positive electrode plate 10 and the non-aqueous electrolyte satisfy a certain condition, and thus, gas generation is promoted and the pressure-type CID is actuated at an early stage at the time of overcharge. Namely, battery 100 is excellent in reliability at the time of overcharge.

<Positive Electrode Plate>

Figure 4:
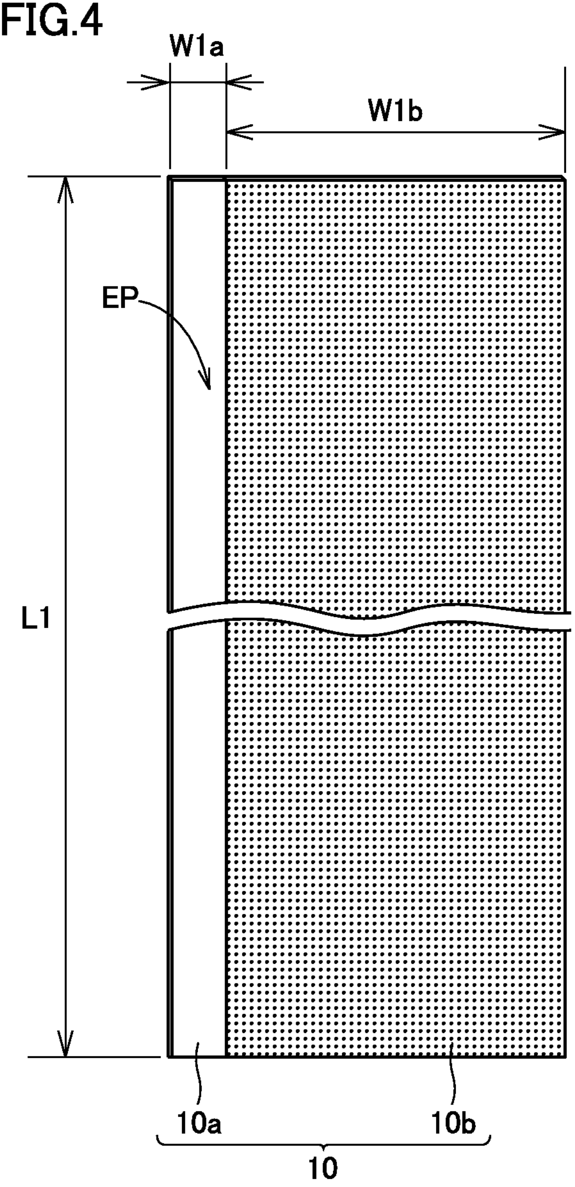
FIG. 4 is a schematic plan view showing one example of a configuration of a positive electrode plate according to one embodiment of the present invention.

FIG. 4 is a schematic plan view showing a configuration of positive electrode plate 10. Referring to FIG. 4, positive electrode plate 10 has a positive electrode collector core material 10*a* and positive electrode composite material layers 10*b* formed on both main surfaces of positive electrode collector core material 10*a*. Positive electrode collector core material 10*a* is, for example, Al foil. Positive electrode plate 10 can be fabricated by a conventionally-known method. For example, positive electrode plate 10 can be fabricated by dispersing a positive electrode composite material in a prescribed solvent to obtain a positive electrode composite material paste and then coating and drying the positive electrode composite material paste on the main surfaces of positive electrode collector core material 10*a*. N-methyl-2-pyrrolidone (NMP) can, for example, be used as the solvent. A thickness and a density may be adjusted by compressing dried positive electrode composite material layers 10*b*.

(Positive Electrode Composite Material Layer)

Positive electrode composite material layer 10*b* is formed by fixing the positive electrode composite material including a first positive electrode active material particle, a second positive electrode active material particle, a conductive material, a binder and the like onto the main surface of positive electrode collector core material 10*a*. The first positive electrode active material particle includes lithium iron phosphate, and the second positive electrode active material particle includes lithium-nickel composite oxide. A ratio of the first positive electrode active material particle to a total mass of the first positive electrode active material particle and the second positive electrode active material particle is 5% by mass or more and 20% by mass or less. As a result, the energy density of the battery can be maintained and gas generation at the time of overcharge can be promoted. From the viewpoint of achieving both of these more highly, the ratio is more preferably 5% by mass or more and 15% by mass or less, and particularly preferably 10% by mass or more and 15% by mass or less.

In addition to the first positive electrode active material particle and the second positive electrode active material particle, positive electrode composite material layer 10*b* may further include third and fourth positive electrode active material particles. For example, positive electrode composite material layer 10*b* may further include a $LiCoO_2$ particle, a $LiMnO_2$ particle, a $LiMn_2O_4$ particle and the like. In this case, however, at least 50% by mass of a total amount of the positive electrode active material included in positive electrode composite material layer 10*b* should be occupied by the first positive electrode active material particle and the second positive electrode active material particle. This is because such a configuration allows gas generation at the time of overcharge to be promoted as long as a mixing ratio of the first positive electrode active material particle and the second positive electrode active material particle is within the aforementioned range. A ratio of the positive electrode active material in positive electrode composite material layer 10*b* is, for example, approximately 85 to 98% by mass, preferably 88% by mass or more and 95% by mass or less, and more preferably 89% by mass or more and 93% by mass or less.

(Porosity)

Positive electrode composite material layer 10*b* is porous and the non-aqueous electrolyte containing a gas generation agent permeates a pore in the layer. A porosity of positive electrode composite material layer 10*b* can be calculated in accordance with the aforementioned equation. The porosity is preferably 20% or more and 32% or less. When the porosity is less than 20%, a contact rate between the positive electrode active material particle and the gas generation agent decreases. On the other hand, when the porosity exceeds 32%, the conductivity between the positive electrode active material particles may decrease and a reaction between the positive electrode active material particle and the gas generation agent may not sufficiently proceed in some cases. Namely, in either case, the gas generation efficiency tends to decrease. According to an experimental result described below, the porosity of positive electrode composite material layer 10*b* is more preferably 22% or more and 30% or less, and particularly preferably 23% or more and 30% or less. The porosity of positive electrode composite material layer 10*b* can be controlled in accordance with a coating weight when coating the positive electrode composite material paste (coating mass per unit area) and a compression rate of positive electrode composite material layer 10*b*.

(First Positive Electrode Active Material Particle)

The first positive electrode active material particle includes lithium iron phosphate. Lithium iron phosphate is composite phosphate expressed by the chemical formula of $LiFePO_4$, and has an olivine-type crystal structure. Since positive electrode composite material layer 10*b* contains lithium iron phosphate, a battery voltage in an overcharge region can be increased and gas generation can be promoted.

"SOC" in the present specification is defined as a fully-charged state being 100%, and "overcharge region" refers to a region (state) in which the SOC exceeds 100%.

As for lithium iron phosphate in the present embodiment, a part of Fe in the aforementioned chemical formula may be replaced with other element (e.g., Co, Ni, Mn and the like) as long as a positive electrode potential at the time of overcharge does not decrease excessively. In addition, lithium iron phosphate may be doped with a tiny amount of a different element. Examples of the different element can include, for example, Mg, Si, Ca, Ti, V, Cr, Zn, Ga, Zr, Nb, Mo, Sn, Hf, W and the like.

The first positive electrode active material particle may be a composite particle having a conductive layer on a surface thereof. This is because, by having the conductive layer, the conductivity of lithium iron phosphate is compensated for and the reaction efficiency at the time of overcharge is improved. A common carbon coating layer can, for example, be used as the conductive layer. At this time, an amount of coating is not particularly limited, and a mass ratio between the base material (lithium iron phosphate particle) and the coating layer (carbon) is, for example, approximately 98:2 to 99:1.

An average particle size of the first positive electrode active material particle is desirably 0.5 μm or more. When the average particle size is less than 0.5 μm, the compressibility of positive electrode composite material layer 10*b* decreases and a problem such as positive electrode plate 10 being cut at the time of winding may occur. An upper limit of the average particle size is not particularly limited. However, in view of the productivity, the upper limit is, for example, approximately 10 μm, and preferably approximately 5 μm.

(Second Positive Electrode Active Material Particle)

The second positive electrode active material particle includes lithium-nickel composite oxide. Lithium-nickel composite oxide is composite oxide including Li and Ni as essential constituent elements, and refers to a compound expressed by a general formula of $LiNi_{1-x}M_xO_2$ (where M represents one or more elements selected from Co, Mn and Al, and x satisfies $0 \leq x < 1$).

Specific examples of such a compound include, for example, $LiNiO_2$, $LiNi_{0.8}Co_{0.2}O_2$, $LiNi_{0.8}Co_{0.15}Al_{0.05}O_2$, $LiNi_{0.5}Mn_{0.5}O_2$, $LiNi_{1/3}Mn_{1/3}Co_{1/3}O_2$ and the like. Lithium-nickel composite oxide is excellent in energy density at high to medium SOC. Among them, a compound expressed by a general formula of $LiNi_aCo_bMn_cO_2$ (where $0<a<1$, $0<b<1$ and $0<c<1$, and $a+b+c=1$ is satisfied), which is typified by $LiNi_{1/3}Mn_{1/3}Co_{1/3}O_2$, is excellent in balance between the energy density and the thermal stability, and thus, this compound is particularly suitable as the second positive electrode active material particle.

In the general formula of $LiNi_aCo_bMn_cO_2$, a, b and c in the formula preferably satisfy $0.2<a<0.4$, $0.2<b<0.4$ and $0.2<c<0.4$, and more preferably satisfy $0.3<a<0.35$, $0.3<b<0.35$ and $0.3<c<0.35$. This is because when composition ratios of Ni, Co and Mn satisfy the aforementioned relationships, the balance between the energy density and the thermal stability is further improved. Lithium-nickel composite oxide may also be doped with a tiny amount of the aforementioned different element.

From the viewpoint of the dispersibility at the time of mixing, an average particle size of the second positive electrode active material particle is, for example, approximately 1 to 20 μm, preferably approximately 3 to 15 μm, and more preferably approximately 5 to 10 μm.

(Conductive Material)

Positive electrode composite material layer 10*b* can contain a conductive material. A conventionally-known material can be used as the conductive material. For example, one or more of acetylene black (AB), Ketjen Black (registered trademark) (a carbon black), scale-like graphite, lump graphite, amorphous graphite, vapor-grown carbon fiber (VGCF) and the like can be used. A ratio of the conductive material in positive electrode composite material layer 10*b* is, for example, approximately 1 to 10% by mass, preferably approximately 2 to 8% by mass, and more preferably approximately 4 to 8% by mass.

(Binder)

Positive electrode composite material layer 10*b* can contain a binder. A conventionally-known material can be used as the binder. For example, polyvinylidene difluoride (PVdF), polytetrafluoroethylene (PTFE) and the like can be used. A ratio of the binder in positive electrode composite material layer 10*b* is, for example, approximately 1 to 5% by mass, and preferably approximately 2 to 4% by mass.

<Non-Aqueous Electrolyte>

The non-aqueous electrolyte is obtained by dissolving a solute (Li salt) in an aprotic solvent. Cyclic carbonates such as ethylene carbonate (EC), propylene carbonate (PC), butylene carbonate (BC), γ-butyrolactone (GBL), and vinylene carbonate (VC), chain carbonates such as dimethyl carbonate (DMC), ethyl methyl carbonate (EMC) and diethyl carbonate (DEC), and other carbonates can, for example, be used as the aprotic solvent. From the viewpoints of the electric conductivity and the electrochemical stability, it is desirable to use two or more of these aprotic solvents together. Particularly, it is desirable to mix and use the cyclic carbonate and the chain carbonate, and at this time, a volume ratio between the cyclic carbonate and the chain carbonate is preferably approximately 1:9 to 5:5. As a specific example, EC, DMC and EMC can, for example, be mixed and used.

Lithium hexafluorophosphate ($LiPF_6$), lithium tetrafluoroborate ($LiBF_4$), lithium perchlorate ($LiClO_4$), lithium hexafluoroarsenate ($LiAsF_6$), lithium bis(trifluoromethanesulfonyl)imide [$Li(CF_3SO_2)_2N$], lithium trifluoromethanesulfonate ($LiCF_3SO_3$) and the like can, for example, be used as the solute (Li salt). Two or more of these solutes may be used together. A concentration of the solute in the non-aqueous electrolyte is not particularly limited. However, from the viewpoints of the discharge property and the preservation property, the concentration is preferably approximately 0.5 to 2.0 mol/L.

(Gas Generation Agent)

The non-aqueous electrolyte of the present embodiment contains a gas generation agent, in addition to the aforementioned components. The gas generation agent is a compound having an oxidation potential in the overcharge region. For example, when an upper limit charging voltage of the battery is approximately 4.0 to 4.2 V, a compound having an oxidation potential of about 4.5 V [vs. $Li^+/Li$] or more can be used as the gas generation agent. Specifically, an aromatic compound such as cyclohexylbenzene (CHB), biphenyl (BP), biphenyl ether (BPE), tert-butylbenzene (TBB), and tert-amylbenzene (TAB), or a derivative thereof can, for example, function as the gas generation agent. Among these, CHB is particularly suitable because CHB generates a large amount of gas.

When the positive electrode potential exceeds the oxidation potential, these compounds start electropolymerization to form a polymerization product, and due to the polymerization product, a battery resistance is increased and the gas is generated, which promotes an increase in internal pressure. However, the mechanism of gas generation is not limited thereto. The gas may be generated in accordance with any mechanism as long as the gas is generated in the overcharge region.

Not only one type but also two or more types of the gas generation agents may be used together. However, from the viewpoint of the amount of generated gas, it is desirable that the gas generation agent includes CHB. Therefore, when two or more types are used together, it is preferable to select a composition such that 50% by mass or more of the total amount of the gas generation agent is occupied by CHB. For example, a mixture obtained by adding CHB and BP at the same mass to the non-aqueous electrolyte can function as the gas generation agent. A ratio of CHB in the gas generation agent is more preferably 70% by mass or more, and particularly preferably 90% by mass or more.

A content of the gas generation agent in the non-aqueous electrolyte (i.e., an amount of the gas generation agent added to the non-aqueous electrolyte) is preferably 1% by mass or more and 7% by mass or less. When the content is less than 1% by mass, a desired amount of generated gas cannot be ensured in some cases. On the other hand, even when the content exceeds 7% by mass, the amount of generated gas does not significantly increase and this is not economical. The content of the gas generation agent is more preferably 2% by mass or more and 5% by mass or less. This is because a larger amount of generated gas can be ensured and the production cost can be reduced.

<Negative Electrode Plate>

Figure 5:
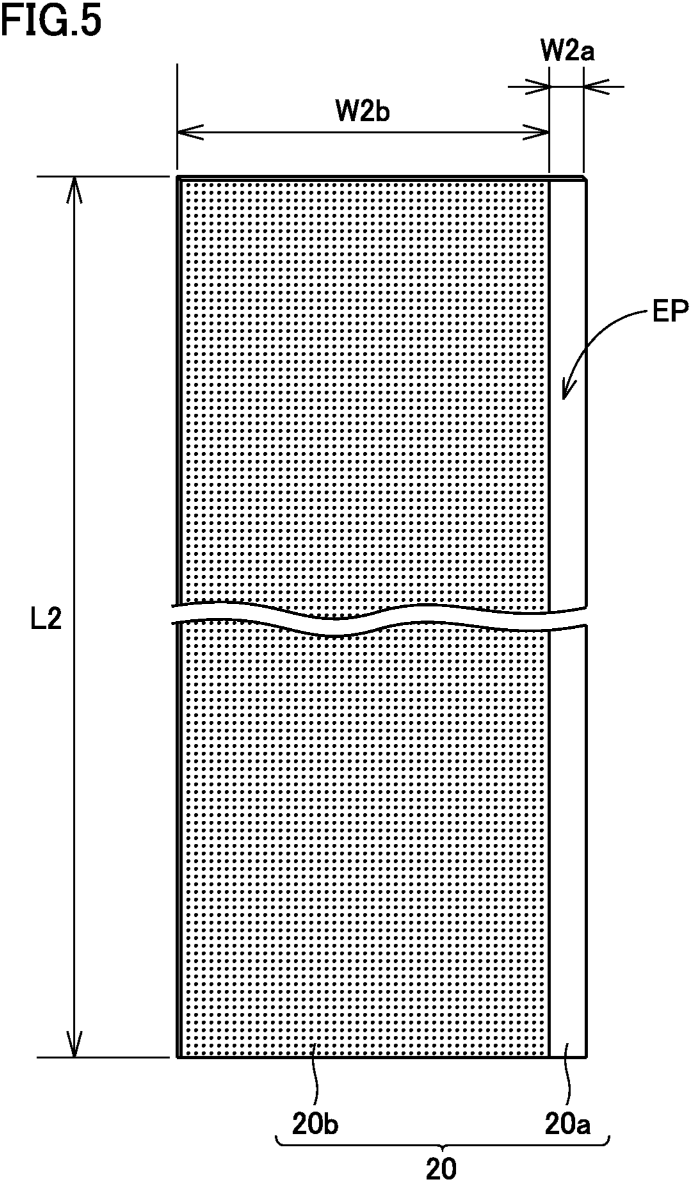
FIG. 5 is a schematic plan view showing one example of a configuration of a negative electrode plate according to one embodiment of the present invention.

FIG. 5 is a schematic plan view showing a configuration of negative electrode plate 20. Referring to FIG. 5, negative electrode plate 20 has a negative electrode collector core material 20*a*, and negative electrode composite material layers 20*b* formed on both main surfaces of negative electrode collector core material 20*a*. Negative electrode collector core material 20*a* is, for example, Cu foil. Negative electrode plate 20 can be fabricated by a conventionally-known method. For example, negative electrode plate 20 can be fabricated by dispersing a negative electrode composite material in a prescribed solvent to obtain a negative electrode composite material paste and then coating and drying the negative electrode composite material paste on the main surfaces of negative electrode collector core material 20*a*. Water (including ion-exchanged water and the like) can, for example, be used as the solvent. A thickness and a density may be adjusted by compressing dried negative electrode composite material layers 20*b*.

(Negative Electrode Composite Material Layer)

Negative electrode composite material layer 20*b* is formed by fixing a negative electrode composite material including a negative electrode active material, a thickener and a binder onto the main surface of negative electrode collector core material 20*a*.

The negative electrode active material is not particularly limited. Any material may be used as long as the material can function as the negative electrode active material of the non-aqueous electrolyte secondary battery. For example, a carbon-based negative electrode active material such as graphite and coke, an alloy-based negative electrode active material such as Si and Sn, or other negative electrode active material can be used. A ratio of the negative electrode active material in negative electrode composite material layer 20*b* is, for example, approximately 90 to 99% by mass.

A conventionally-known material can be used as the thickener and the binder. Carboxymethyl cellulose (CMC), polyvinyl alcohol (PVA) and the like can, for example, be used as the thickener. Styrene-butadiene rubber (SBR), ionomer resin, PTFE and the like can, for example, be used as the binder. A ratio of the thickener and the binder in negative electrode composite material layer 20*b* is, for example, approximately 1 to 10% by mass.

<Separator>

Separator 40 allows $Li^+$ to pass therethrough and prevents electric contact between positive electrode plate 10 and negative electrode plate 20. From the viewpoints of the mechanical strength and the chemical stability, separator 40 is preferably a microporous membrane made of a polyolefin-based material. For example, a microporous membrane made of polyethylene (PE), polypropylene (PP) or the like is suitable.

Alternatively, separator 40 may be a separator obtained by stacking a plurality of microporous membranes, or a separator including a heat-resistant layer having an inorganic filler (e.g., an alumina particle, a titania particle and the like) on a surface thereof. A thickness of separator 40 is, for example, approximately 5 to 40 μm. A pore size and a porosity of separator 40 may be adjusted as appropriate such that an air permeability has a desired value.

The present embodiment has been described above by taking the rectangular battery as an example. However, this is merely one example. The present embodiment is not limited to the rectangular battery and is also applicable to, for example, a cylindrical battery and a pouch-type battery (also referred to as "laminate-type battery").

Example

The present embodiment will be described in more detail hereinafter with reference to an example, while the present embodiment is not limited thereto.

[Experimental Method]

A laminate-type battery, conditions of an overcharge test, and a method for evaluating an amount of generated gas that are common to Experiment 1 to Experiment 3 described below will be first described.

<Fabrication of Laminate-Type Battery>

In the present experiment, the laminate-type battery (rated capacity: 25 Ah) was used to measure the amount of generated gas at the time of overcharge. This laminate-type battery is similar to the rectangular battery described as the embodiment, except that the laminate-type battery does not include a pressure-type CID and a package thereof is a laminate film.

(Fabrication of Positive Electrode Plate)

Referring to FIG. 4, positive electrode plate 10, which was a long strip-like sheet member and had core exposed portion EP at one side end in the shorter-side direction, was fabricated. In the present experiment, a length dimension L1 of positive electrode plate 10 in FIG. 4 was set at 6150 mm, a width dimension W1*b* of positive electrode composite material layer 10*b* was set at 115 mm, and a width dimension W1*a* of core exposed portion EP was set at 13 mm.

First, $LiFePO_4$ powder (average particle size: 1 μm) was prepared as powder of a first positive electrode active material particle, $LiNi_{1/3}Co_{1/3}Mn_{1/3}O_2$ powder (average particle size: 8 μm) was prepared as powder of a second positive electrode active material particle, AB powder (product name: "Denka Black" manufactured by Denki Kagaku Kogyo Kabushiki Kaisha) and scale-like graphite powder (product type: "KS-4" manufactured by Timcal) were prepared as conductive materials, and PVdF powder was prepared as a binder.

Next, these materials were kneaded with a solvent (NMP) in a kneading apparatus to obtain a positive electrode composite material paste. A mixing ratio (mass ratio) of the positive electrode composite materials at this time was set at the positive electrode active material:the conductive material (AB):the conductive material (scale-like graphite):the binder (PVdF)=91:3:3:3. In addition, a non-volatile content concentration (NV) of the positive electrode composite material paste was set at 65% by mass. A breakdown of the positive electrode active material (a mixing ratio of the first positive electrode active material particle and the second positive electrode active material particle) will be described below for each experimental example.

Next, by using a die coater, the positive electrode composite material paste was coated on both main surfaces of Al foil (positive electrode collector core material 10*a*) having a thickness of 15 μm and was dried to form positive electrode composite material layer 10*b*. Then, positive electrode composite material layer 10*b* was rolled by using a rolling machine, and further, was cut by a slitter to obtain positive electrode plate 10. At the time of rolling, a thickness dimension T of positive electrode composite material layer 10*b* was adjusted such that a porosity had each value described below.

(Fabrication of Negative Electrode Plate)

Referring to FIG. 5, negative electrode plate 20, which was a long strip-like sheet member and had core exposed portion EP at one side end in the shorter-side direction, was fabricated. In the present experiment, a length dimension L2 of negative electrode plate 20 in FIG. 5 was set at 6300 mm, a width dimension W2*b* of negative electrode composite material layer 20*b* was set at 120 mm, and a width dimension W2*a* of core exposed portion EP was set at 11 mm.

First, powder of a spheroidized graphite particle (a surface is coated with artificial graphite) was prepared as powder of a negative electrode active material, CMC (product type: "BSH-6" manufactured by Dai-ichi Kogyo Seiyaku Co, Ltd.) was prepared as a thickener, and CHEMIPEARL S650 (a water dispersion of an ionomer resin particle of an ethylene-methacrylic acid copolymer manufactured by Mitsui Chemicals, Inc.) was prepared as a binder.

Next, these materials were kneaded with a solvent (water) in the kneading apparatus to obtain a negative electrode composite material paste. A mixing ratio (mass ratio) of the negative electrode composite materials at this time was set at the negative electrode active material (graphite):the thickener (CMC):the binder (S650)=100:1:1.

Next, by using the die coater, the negative electrode composite material paste was coated on both main surfaces of Cu foil (negative electrode collector core material 20*a*) having a thickness of 10 μm and was dried to form negative electrode composite material layer 20*b*. Then, negative electrode composite material layer 20*b* was rolled by using the rolling machine, and further, was cut by the slitter to obtain negative electrode plate 20.

(Preparation of Separator)

First, a separator base member (thickness: 20 μm) having a three-layer structure of PP/PE/PP was prepared. Next, an alumina particle (96 parts by mass) which was an inorganic filler, an acrylic resin binder (4 parts by mass) and a solvent (ion-exchanged water) were mixed by using CLEARMIX (manufactured by M Technique Co, Ltd.) to obtain a slurry which will form a heat-resistant layer. Then, by using a gravure coater, the slurry was coated on the separator base member and was dried to form the heat-resistant layer on the base member. Separator 40 was thus obtained.

(Preparation of Non-Aqueous Electrolyte)

EC, DMC and EMC were mixed at EC:DMC:EMC=3:4:3 (volume ratio) to obtain a mixed solvent. Then, $LiPF_6$ (1.0 mol/L) and CHB were dissolved in the mixed solvent. A non-aqueous electrolyte was thus obtained. An amount of added CHB will be described below for each experimental example.

(Assembly)

Referring to FIG. 3, positive electrode plate 10 and negative electrode plate 20 were wound such that positive electrode plate 10 and negative electrode plate 20 faced each other with separator 40 interposed therebetween, and thereby, an oval wound body was obtained. Then, by using a flat plate pressing machine, the oval wound body was pressed (pressure: 4 $kN/cm^2$, time: 2 minutes) into a flat shape under the ordinary temperature. Electrode assembly 80 was thus obtained.

Referring to FIG. 2, positive electrode collector plate 74 and negative electrode collector plate 76 were welded to electrode assembly 80, respectively. Then, positive electrode collector plate 74 and positive electrode terminal 70 were connected to each other, and negative electrode collector plate 76 and negative electrode terminal 72 were connected to each other.

Electrode assembly 80 was housed in the package formed of a laminate film, and further, the non-aqueous electrolyte (125 g) prepared above was injected. Then, by using a heat sealer, an opening of the package was sealed such that positive electrode terminal 70 and negative electrode terminal 72 were exposed from the package to the outside. The laminate-type battery (rated capacity: 25 Ah) was thus obtained.

<Overcharge Test>

Charge was continued at a current value of 1 CA (25 A) and in the environment of 60° C. until the SOC of the battery reached 140%. A reason why the ambient environment was set at 60° C. is to verify whether the amount of gas can be ensured even in the high temperature environment in which the amount of generated gas decreases. In addition, a reason why an upper limit of the SOC was set at 140% is to verify whether the amount of gas can be ensured earlier than the conventional one (160%).

<Evaluation of Amount of Generated Gas>

The amount of generated gas was measured by using the Archimedes' principle. The procedure of measurement is as follows. First, the battery before the overcharge test is immersed in water and the buoyancy is measured to obtain a pretest volume. Next, the overcharge test is conducted, and after the test, a volume (posttest volume) of the battery inflated due to gas generation is obtained similarly to before the test. Then, by subtracting the pretest volume from the posttest volume, the amount of generated gas is calculated.

In the present experiment, in order to eliminate an influence caused by a difference in rated capacity, the amount of generated gas was evaluated by using a value [unit: $cm^3/Ah$] obtained by dividing the amount of generated gas [unit: $cm^3$] by the rated capacity [unit: Ah]. When this value is 20 $cm^3/Ah$ or more, the pressure-type CID can be reliably actuated even in the battery having a large space volume.

[Experiment 1: Verification about Mixing Ratio of Lithium Iron Phosphate]

In Experiment 1, an influence of a mixing ratio of lithium iron phosphate on the amount of generated gas at the time of overcharge was verified. Specifically, as shown in Table 1, the laminate-type batteries, i.e., batteries A1 to A4 and batteries B1 to B4, were fabricated, with the CHB content in the non-aqueous electrolyte fixed to 2% by mass and the mixing ratio of the first positive electrode active material particle and the second positive electrode active material particle changed. Then, the overcharge test was conducted and the amount of generated gas was measured. The result is shown in Table 1.

All batteries in Table 1 are fabricated on the same conditions except that the ratio of the first positive electrode active material particle and the porosity of the positive electrode composite material layer are different. In Table 1, batteries A1 to A4 correspond to Examples and batteries B1 to B4 correspond to Comparative Examples.

In addition, "porosity" of the positive electrode composite material layer in Table 1 was calculated in accordance with the aforementioned equation. When calculating the porosity, a value obtained by subtracting a thickness of positive electrode collector core material 10_a_ from a thickness of positive electrode plate 10 was used as "thickness dimension T of positive electrode composite material layer 10_b_" because positive electrode plate 10 had positive electrode composite material layers 10_b_ on both main surfaces of positive electrode collector core material 10_a_. Furthermore, a value obtained by subtracting a mass of positive electrode collector core material 10_a_ from a mass of positive electrode plate 10 was used as "mass of the positive electrode composite material layer".

Figure 6:
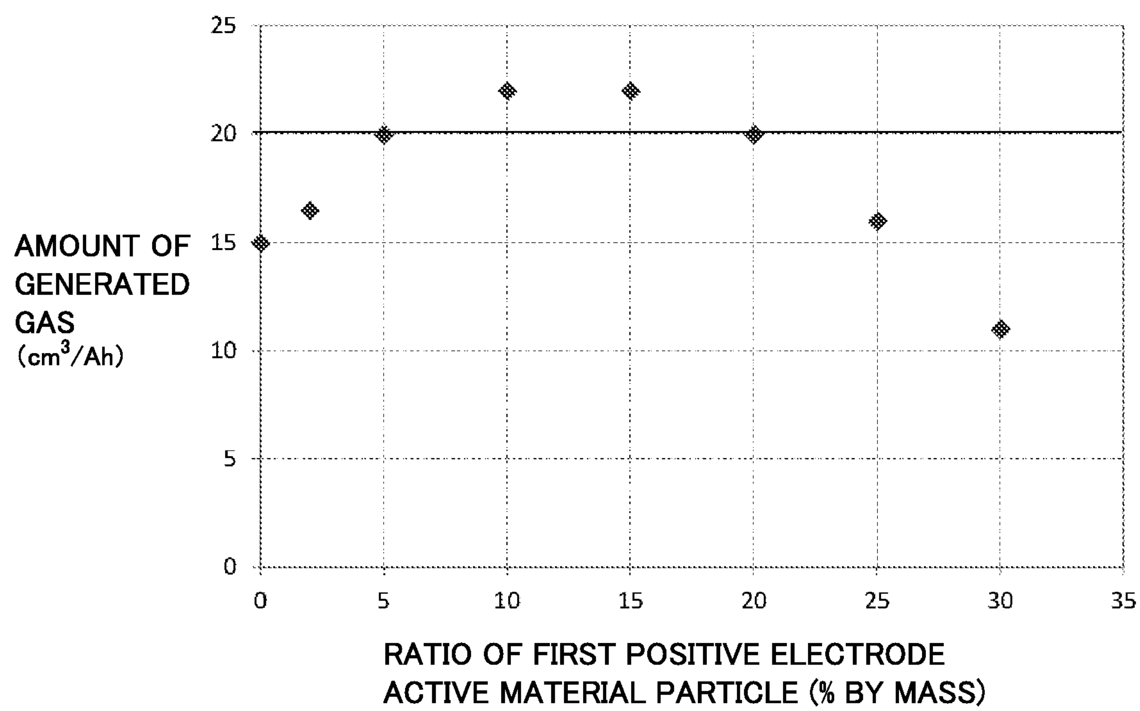
FIG. 6 is a graph showing one example of a relationship between a ratio of a first positive electrode active material particle and an amount of generated gas in an overcharge test.

FIG. 6 is a graph showing a relationship between the ratio of the first positive electrode active material particle to the first positive electrode active material particle including lithium iron phosphate and the second positive electrode active material particle including lithium-nickel composite oxide, and the amount of generated gas in the overcharge test. Referring to FIG. 6, the amount of generated gas increases significantly, when the ratio of the first positive electrode active material particle is 5% by mass or more and 20% by mass or less. This is considered to be because gas generation is promoted by lithium iron phosphate having a high positive electrode potential in the overcharge region.

Based on Table 1 and FIG. 6, in batteries B1 and B2 in which the ratio of the first positive electrode active material particle is less than 5% by mass, the amount of generated gas (20 $cm^3/Ah$) for reliably actuating the pressure-type CID cannot be achieved. Based on this result, it is conceivable that when the first positive electrode active material particle is less than 5% by mass, the positive electrode potential at the time of overcharge does not become sufficiently high. Therefore, the ratio of the first positive electrode active material particle must be 5% by mass or more.

Based on Table 1 and FIG. 6, as the ratio of the first positive electrode active material particle increases, the amount of generated gas increases, and when the ratio of the first positive electrode active material particle is 10% by mass (battery A2) and 15% by mass (battery A3), the amount of generated gas is maximized. Therefore, it is particularly preferable that the ratio of the first positive electrode active material particle is 10% by mass or more and 15% by mass or less.

When the ratio of the first positive electrode active material particle exceeds 15% by mass, the amount of

TABLE 1

| | Positive electrode composite material layer | | | | |
|---|---|---|---|---|---|
| | First positive electrode active material particle $LiFePO_4$ % by mass | Second positive electrode active material particle $LiNi_{1/3}Co_{1/3}Mn_{1/3}O_2$ % by mass | Porosity % | Non-aqueous electrolyte Gas generation agent CHB % by mass | Overcharge test Amount of generated gas $cm^3/Ah$ |
| Battery A1 | 5 | 95 | 25 | 2 | 20.0 |
| Battery A2 | 10 | 90 | 23 | 2 | 22.0 |
| Battery A3 | 15 | 85 | 22 | 2 | 22.0 |
| Battery A4 | 20 | 80 | 20 | 2 | 20.0 |
| Battery B1 | 0 | 100 | 27 | 2 | 15.0 |
| Battery B2 | 2 | 98 | 26 | 2 | 16.5 |
| Battery B3 | 25 | 75 | 19 | 2 | 16.0 |
| Battery B4 | 30 | 70 | 17 | 2 | 11.0 |

generated gas starts to decrease. A reason for this can be explained by the porosity of the positive electrode composite material layer. Specifically, as the ratio of the first positive electrode active material particle increases, the positive electrode potential becomes higher. However, in the present experiment, the rated capacity of the battery is kept constant, and thus, as the ratio of the first positive electrode active material particle having a small capacity increases, the porosity of the positive electrode composite material layer decreases. With the decrease in porosity, the reaction efficiency of the gas generation agent decreases.

Furthermore, when the ratio of the first positive electrode active material particle reaches 25% by mass, the amount of generated gas of 20 $cm^3/Ah$ can no longer be ensured. Therefore, based on these results, the ratio of the first positive electrode active material particle must be 20% by mass or less. At the same time, it is preferable that the porosity of the positive electrode composite material layer is 20% or more.

[Experiment 2: Verification about Porosity of Positive Electrode Composite Material Layer]

In Experiment 1, the rated capacity of the battery was kept constant. Therefore, as the ratio of the first positive electrode active material particle increases, the porosity decreases. Thus, in Experiment 2, as shown in Table 2, an influence of the porosity on the amount of generated gas at the time of overcharge was verified, with the ratio of the first positive electrode active material particle kept constant and the porosity changed. The result is shown in Table 2.

TABLE 2

| | Positive electrode composite material layer | | | | |
|---|---|---|---|---|---|
| | First positive electrode active material particle $LiFePO_4$ % by mass | Second positive electrode active material particle $LiNi_{1/3}Co_{1/3}Mn_{1/3}O_2$ % by mass | Porosity % | Non-aqueous electrolyte Gas generation agent CHB % by mass | Overcharge test Amount of generated gas $cm^3/Ah$ |
| Battery A4 | 20 | 80 | 20 | 2 | 20.0 |
| Battery A5 | 20 | 80 | 25 | 2 | 24.0 |
| Battery A6 | 20 | 80 | 30 | 2 | 26.3 |
| Battery A7 | 20 | 80 | 32 | 2 | 26.4 |
| Battery B5 | 20 | 80 | 35 | 2 | 24.4 |
| Battery B6 | 20 | 80 | 40 | 2 | 18.3 |

All batteries in Table 2 are fabricated on the same conditions except that the porosity of the positive electrode composite material layer is different. In Table 2, batteries A4 to A7, B5 and B6 all correspond to Examples.

Figure 7:
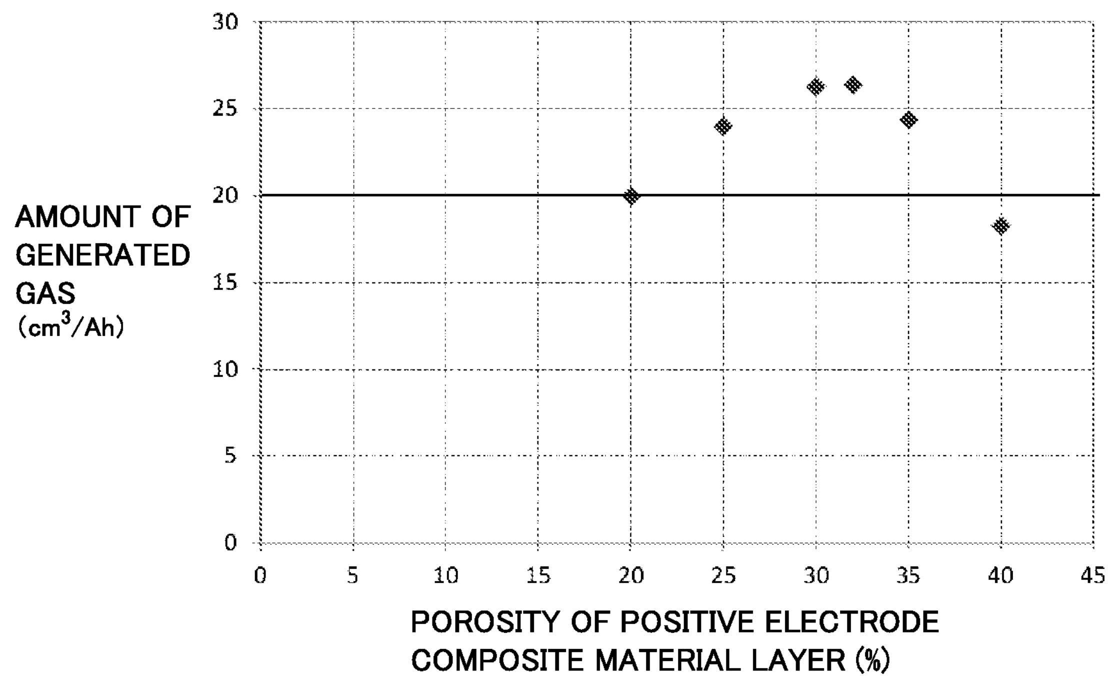
FIG. 7 is a graph showing one example of a relationship between a porosity of a positive electrode composite material layer and an amount of generated gas in an overcharge test.

FIG. 7 is a graph showing a relationship between the porosity of the positive electrode composite material layer and the amount of generated gas at the time of the overcharge test. Referring to Table 2 and FIG. 7, it can be seen that when the porosity is in the range of 20% to 32% (batteries A4 to A7), the amount of generated gas tends to increase as the porosity increases. However, when the porosity exceeds 32%, the amount of generated gas starts to decrease (batteries B5 and B6). This is considered to be because when the porosity exceeds 32%, the conductivity between the positive electrode active material particles decreases and a reaction between the gas generation agent and the positive electrode active material particle does not proceed sufficiently. Therefore, it is preferable to set an upper limit value of the porosity at 32%.

As the porosity of the positive electrode composite material layer increases, the capacity per volume decreases. However, an influence thereof is minor if the porosity is in the range of 20% to 32%.

[Experiment 3: Verification about CHB Content]

In Experiment 3, as shown in Table 3, an influence of the CHB content on the amount of generated gas was verified, with the ratio of the first positive electrode active material particle and the porosity kept constant and the amount of CHB added to the non-aqueous electrolyte (i.e., the CHB content in the non-aqueous electrolyte) changed. The result is shown in Table 3.

TABLE 3

| | Positive electrode composite material layer | | | | |
|---|---|---|---|---|---|
| | First positive electrode active material particle $LiFePO_4$ % by mass | Second positive electrode active material particle $LiNi_{1/3}Co_{1/3}Mn_{1/3}O_2$ % by mass | Porosity % | Non-aqueous electrolyte Gas generation agent CHB % by mass | Overcharge test Amount of generated gas $cm^3/Ah$ |
| Battery A1 | 5 | 95 | 25 | 2 | 20.0 |
| Battery A8 | 5 | 95 | 25 | 5 | 46.2 |

TABLE 3-continued

| | Positive electrode composite material layer | | | | |
|---|---|---|---|---|---|
| | First positive electrode active material particle $LiFePO_4$ % by mass | Second positive electrode active material particle $LiNi_{1/3}Co_{1/3}Mn_{1/3}O_2$ % by mass | Porosity % | Non-aqueous electrolyte Gas generation agent CHB % by mass | Overcharge test Amount of generated gas $cm^3/Ah$ |
| Battery A9 | 5 | 95 | 25 | 7 | 52.8 |
| Battery A10 | 5 | 95 | 25 | 10 | 52.8 |
| Battery B7 | 5 | 95 | 25 | 1 | 11.4 |
| Battery B8 | 5 | 95 | 25 | 0 | 0 |

All batteries in Table 3 are fabricated on the same conditions except that the CHB content is different. In Table 3, batteries A1, A8 to A10 and B7 correspond to Examples and battery B8 corresponds to Comparative Example.

Figure 8:
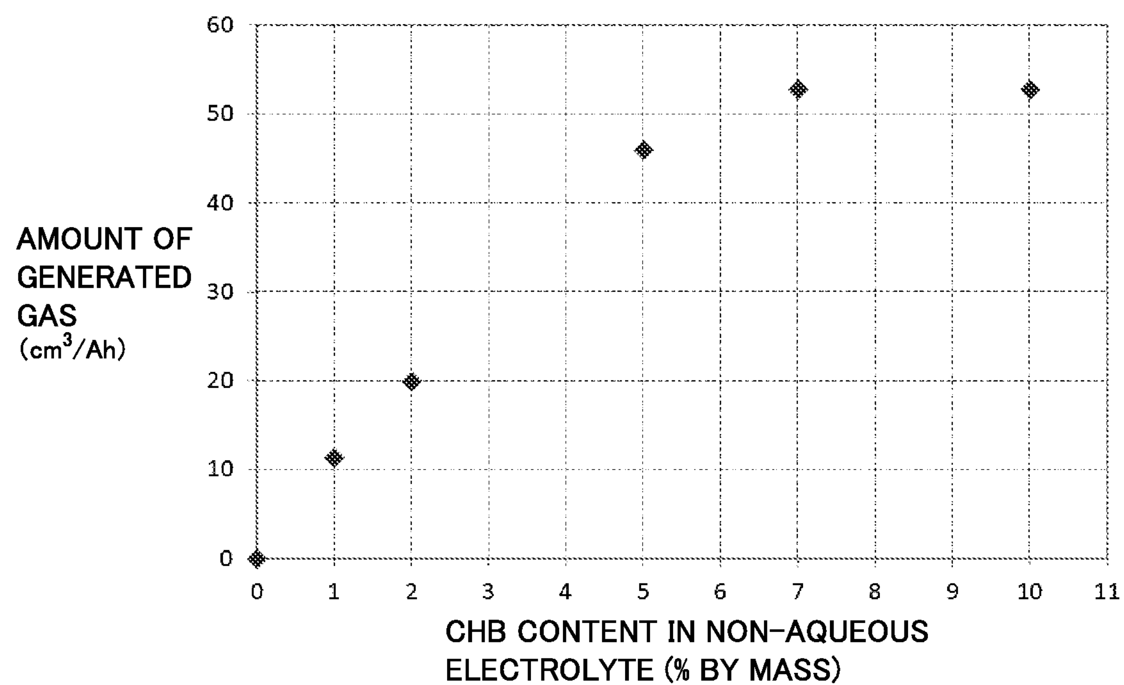
FIG. 8 is a graph showing one example of a relationship between a content of a gas generation agent in a non-aqueous electrolyte and an amount of generated gas in an overcharge test.

FIG. 8 is a graph showing a relationship between the CHB content in the non-aqueous electrolyte and the amount of generated gas in the overcharge test. Based on Table 3 and FIG. 8, it can be seen that as the CHB content in the non-aqueous electrolyte increases, the amount of generated gas increases. However, it can be seen that when and after the CHB content exceeds 7% by mass, the amount of generated gas is saturated, and thus, a further significant improvement cannot be expected after the CHB content exceeds 7% by mass.

Thus, the discharge property and the cycle property of battery A10 having a CHB content of 10% by mass were measured. Then, a pronounced adverse effect of CHB was not found. However, since an increase in amount of generated gas is not seen, it is clear that addition of CHB in excess of 7% by mass is not economical. Therefore, the CHB content is preferably 7% by mass or less. Since the sufficient amount of generated gas can be ensured even when the CHB content is 5% by mass, the CHB content is more preferably 5% by mass or less.

On the other hand, in battery B7 having a CHB content of 1% by mass, 20 $cm^3/Ah$ could not be ensured. As described above, in the present experiment, the amount of generated gas was measured in the state of the SOC being 140%. Thus, the amount of generated gas was measured in the state of the SOC being 160%. Then, in battery B7 as well, the amount of generated gas exceeding 20 $cm^3/Ah$ could be ensured. The amount of generated gas at this time was larger than the amount of generated gas when the SOC of battery B1 was 160%. Furthermore, with consideration given to the results of Experiment 1 and Experiment 2, it is conceivable that, depending on the ratio of the first positive electrode active material particle and the porosity of the positive electrode composite material layer, the amount of generated gas (20 $cm^3/Ah$) can be ensured even when the CHB content is 1% by mass. Therefore, a lower limit value of the CHB content is preferably 1% by mass. In addition, based on the aforementioned results, the lower limit value of the CHB content is more preferably 2% by mass or more.

Based on the aforementioned experimental results, it could be confirmed that, as compared with a conventional non-aqueous electrolyte secondary battery that does not satisfy the aforementioned conditions, a pressure-type CID is actuated reliably and at an early stage in a non-aqueous electrolyte secondary battery including: a pressure-type CID arranged in a conductive path, for interrupting the conductive path when an internal pressure exceeds a working pressure; a non-aqueous electrolyte; and a positive electrode composite material layer, wherein the non-aqueous electrolyte contains a gas generation agent that generates a gas in an overcharge region, the positive electrode composite material layer contains a first positive electrode active material particle including lithium iron phosphate, and a second positive electrode active material particle including lithium-nickel composite oxide, and a ratio of the first positive electrode active material particle to a total mass of the first positive electrode active material particle and the second positive electrode active material particle is 5% by mass or more and 20% by mass or less.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A non-aqueous electrolyte secondary battery, comprising:

a pressure-type current interrupt device arranged in a conductive path, for interrupting said conductive path when an internal pressure exceeds a working pressure;

a non-aqueous electrolyte;

a negative electrode comprising a negative electrode composite material layer;

a separator; and a positive electrode comprising a positive electrode composite material layer directly contacting the separator, wherein said non-aqueous electrolyte contains a gas generation agent that generates a gas in an overcharge region, said positive electrode composite material layer consists of a positive electrode active material containing a first positive electrode active material particle including lithium iron phosphate, a second positive electrode active material particle including lithium-nickel composite oxide, a conductive material, and a binder, a ratio of a mass of said first positive electrode active material particle to a total mass of the mass of said first positive electrode active material particle and a mass of said second positive electrode active material particle is 5% by mass or more and 20% by mass or less, a porosity of said positive electrode composite material layer is 20% or more and 32% or less, said gas generation agent includes cyclohexylbenzene having a formula $C_6H_5—C_6H_{11}$ and a content of said cyclohexylbenzene in said non-aqueous electrolyte is 2% by mass or more and 7% by mass or less, said lithium iron phosphate is $LiFePO_4$ having an olivine-type crystal structure, said lithium-nickel composite oxide is a compound expressed by the formula $LiNi_{1-x}M_xO_2$, where M represents one or more elements selected from Co, Mn and Al, and x satisfies $0 \leq x < 1$, a ratio of said positive electrode active material in said positive electrode composite material layer is 85% by mass or more and 98% by mass or less, said conductive material is one or more selected from the group consisting of carbon black, graphite and carbon fiber, a ratio of said conductive material in said positive electrode active material layer is 1% by mass or more and 10% by mass or less, a ratio of said binder said positive electrode active material layer is 1% by mass or more and 5% by mass or less, said first positive electrode active material particle has an average particle size of 0.5 μm or more and 5 μm or less, said second positive electrode active material particle has an average particle size of 1 μm or more and 20 μm or less, said separator has a thickness of 5 μm or more and 40 μm or less, said separator is a multi-layer structure comprising (i) a microporous membrane made of a polyolefin and (ii) a heat resistant-layer including an inorganic filler, said negative electrode composite material layer comprises a negative electrode active material, a thickener and a binder, said first positive electrode active material particle is coated with a conductive carbon coating, and a mass ratio between said first positive electrode active material particle and said conductive carbon coating is 98:2 to 99:1, and said secondary battery is configured such that a gas generation amount in said overcharge region is 20 $cm^3$/Ah or more when said secondary battery is charged at a current value of 1 CA at a temperature of 60° C. until a state of charge of said secondary battery reached 140%, wherein said gas generation amount is obtained by dividing an amount of generated gas ($cm^3$) by a rated capacity of said secondary battery, and said current value of 1 CA is defined as a current using up the rated capacity in one hour.

2. The non-aqueous electrolyte secondary battery according to claim 1, wherein a porosity of said positive electrode composite material layer is 23% or more and 30% or less.

3. The non-aqueous electrolyte secondary battery according to claim 1, wherein said lithium-nickel composite oxide is selected from the group consisting of $LiNiO_2$, $LiNi_{0.8}Co_{0.2}O_2$, $LiNi_{0.8}Co_{0.15}Al_{0.05}O_2$, $LiNi_{0.5}Mn_{0.5}O_2$ and $LiNi_aCo_bMn_cO_2$, wherein 0<a<1, 0<b<1 and 0<c<1, and a+b+c=1.

4. The non-aqueous electrolyte secondary battery according to claim 3, wherein said lithium-nickel composite oxide is $LiNi_aCo_bMn_cO_2$.

5. The non-aqueous electrolyte secondary battery according to claim 4, wherein 0.2<a<0.4, 0.2<b<0.4 and 0.2<c<0.4.

6. The non-aqueous electrolyte secondary battery according to claim 4, wherein 0.3<a<0.35, 0.3<b<0.35 and 0.3<c<0.35.

7. The non-aqueous electrolyte secondary battery according to claim 1, wherein said lithium-nickel composite oxide is $LiN_{1/3}Mn_{1/3}Co_{1/3}O_2$.

8. The non-aqueous electrolyte secondary battery according to claim 1, wherein a part of the Fe in $LiFePO_4$ is replaced with an element selected from the group consisting of Co, Ni and Mn.

9. The non-aqueous electrolyte secondary battery according to claim 3, wherein a porosity of said positive electrode composite material layer is 23% or more and 30% or less.

10. The non-aqueous electrolyte secondary battery according to claim 1, wherein the ratio of said first positive electrode active material particle to the total mass of said first positive electrode active material particle and said second positive electrode active material particle is 10% by mass or more and 15% by mass or less.

11. The non-aqueous electrolyte secondary battery according to claim 1, wherein the ratio of said first positive electrode active material particle to the total mass of said first positive electrode active material particle and said second positive electrode active material particle is 10% by mass or more and 15% by mass or less, and a porosity of said positive electrode composite material layer is 23% or more and 30% or less.

12. The non-aqueous electrolyte secondary battery according to claim 1, wherein the non-aqueous electrolyte further contains a lithium salt and at least one aprotic solvent selected group consisting of a cyclic carbonate and a chain carbonate.

13. The non-aqueous electrolyte secondary battery according to claim 1, wherein the non-aqueous electrolyte further contains a lithium salt, at least one cyclic carbonate solvent, and at least one chain carbonate solvent.

14. The non-aqueous electrolyte secondary battery according to claim 13, wherein the cyclic carbonate solvent is at least one selected from the group consisting of ethylene carbonate (EC), propylene carbonate (PC), butylene carbonate (BC), γ-butyrolactone (GBL) and vinylene carbonate (VC); and the chain carbonate solvent is at least one selected from the group consisting of dimethyl carbonate (DMC), ethyl methyl carbonate (EMC) and diethyl carbonate (DEC).

15. The non-aqueous electrolyte secondary battery according to claim 1, wherein the non-aqueous electrolyte further contains a lithium salt and at least one aprotic solvent selected from the group consisting of ethylene carbonate (EC), propylene carbonate (PC), butylene carbonate (BC), γ-butyrolactone (GBL), vinylene carbonate (VC), dimethyl carbonate (DMC), ethyl methyl carbonate (EMC) and diethyl carbonate (DEC).

16. The non-aqueous electrolyte secondary battery according to claim 3, wherein the non-aqueous electrolyte further contains a lithium salt, at least one cyclic carbonate solvent and at least one chain carbonate solvent.

17. The non-aqueous electrolyte secondary battery according to claim 5, wherein the non-aqueous electrolyte further contains a lithium salt, at least one cyclic carbonate solvent and at least one chain carbonate solvent.

18. The non-aqueous electrolyte secondary battery according to claim 7, wherein the non-aqueous electrolyte further contains a lithium salt, at least one cyclic carbonate solvent and at least one chain carbonate solvent.

19. The non-aqueous electrolyte secondary battery according to claim 18, wherein the cyclic carbonate solvent is at least one selected from the group consisting of ethylene carbonate (EC), propylene carbonate (PC), butylene carbonate (BC), γ-butyrolactone (GBL) and vinylene carbonate (VC); and the chain carbonate solvent is at least one selected from the group consisting of dimethyl carbonate (DMC), ethyl methyl carbonate (EMC) and diethyl carbonate (DEC).

20. The non-aqueous electrolyte secondary battery according to claim 1, wherein the lithium-nickel composite oxide has a larger capacity per volume than the lithium iron phosphate, and the lithium-nickel composite oxide has a lower potential than the lithium iron phosphate in the overcharge region.

* * * * *